United States Patent [19]

Matsushima et al.

[11] Patent Number: 4,984,474
[45] Date of Patent: Jan. 15, 1991

[54] TORQUE SENSOR

[75] Inventors: Jun Matsushima; Tetsuto Kageyama; Shigekazu Nakamura; Kenji Wakazono, all of Tokyo, Japan

[73] Assignee: Copal Company Limited, Tokyo, Japan

[21] Appl. No.: 413,306

[22] Filed: Sep. 27, 1989

[30] Foreign Application Priority Data

| Sep. 30, 1988 | [JP] | Japan | 63-244454 |
| Nov. 24, 1988 | [JP] | Japan | 63-294588 |
| Dec. 16, 1988 | [JP] | Japan | 63-316512 |
| Sep. 19, 1989 | [JP] | Japan | 1-108584[U] |

[51] Int. Cl.$^5$ .................. G01L 3/10; G01B 7/14
[52] U.S. Cl. .................. 73/862.33; 324/207.14; 324/207.22; 324/207.25
[58] Field of Search .............. 73/862.33; 324/207.25, 324/207.22, 207.21, 207.2, 174, 207.14

[56] References Cited

U.S. PATENT DOCUMENTS

| 3,170,323 | 2/1965 | Kuhrt et al. |
| 4,119,911 | 10/1978 | Johnson, Jr. |
| 4,448,275 | 5/1984 | Kitagawa et al. |
| 4,488,443 | 12/1984 | Parkinson |
| 4,682,104 | 7/1987 | Lombard et al. |
| 4,724,710 | 2/1988 | Murty |
| 4,784,002 | 11/1988 | Shinichi |

FOREIGN PATENT DOCUMENTS

| 58-167934 | 10/1983 | Japan |
| 62-60657 | 12/1987 | Japan |
| 63-153439 | 6/1988 | Japan |
| 63-158433 | 7/1988 | Japan |
| 63-171332 | 7/1988 | Japan |
| 63-171333 | 7/1988 | Japan |

Primary Examiner—Charles A. Ruehl
Attorney, Agent, or Firm—Finnegan, Henderson, Farabow, Garrett & Dunner

[57] ABSTRACT

A torque sensor for use in detecting torsion of a power steering device or the like of a vehicle. The torque sensor is provided with a first shaft supported for rotation about its axis in a casing, a permanent magnet secured to the first shaft, a second shaft supported for rotation about its axis in the casing and disposed in end-to-end relationship to the first shaft, a connecting shaft for connecting the first shaft and the second shaft, a magnetic core secured to the second shaft and a magnetism sensor secured to the casing and sandwiched between ring-shaped magnetic members disposed in the vicinity of the outer peripheral face of the magnetic core so that a change in magnetic flux which is caused by the relative displacement of the permanent magnet and the magnetic core is detected by the magnetism sensor as the direction of a variation in the relative position of and the amount of variation in a displacement of the first shaft and the second shaft about the axis of rotation of the first and second shafts.

15 Claims, 18 Drawing Sheets

TORQUE SENSOR

BACKGROUND OF THE INVENTION

1. Field of the Invention

The present invention relates to a torque sensor of the type which is arranged to detect torsion by detecting the relative displacement of a first shaft and a second shaft which are connected via a connecting means.

2. Description of the Related Art

Proposals have heretofore been made with respect to an apparatus of the type which is arranged to detect the direction of and the amount of variation in the relative angular variation between first and second shafts which are connected via a torsion bar serving as connecting means and then to impart to the second shaft a driving force which corresponds to the result of that detection.

For example, a known type of torque sensor for power-steering purposes is disclosed in U.S. Pat. No. 4,448,275 entitled "TORQUE SENSOR". This torque sensor is constructed using a sliding contact for detecting a variation in the relative angle between a first shaft——an input shaft through which a rotational force is transmitted from a steering wheel and a second shaft——an output shaft which is connected to a steering gear.

The torque sensor of this slide contact type comprises a detecting portion consisting of a slide contact, a resistive wire and the like, all of which cooperate to detect a variation in the relative angle between the input shaft and the output shaft and a pickup portion consisting of a slip ring, a brush and the like which cooperate to transmit to the outside the detection result of the variation in the relative angle between the first shaft and the second shaft.

In practical examples based on this proposal, the detecting portion and the pick portion, as the basic principle, rely on the above-described slide-contact system. Accordingly, to meet safety standards for vehicles, the slip ring is plated with gold and the resistive wire is formed on a ceramic board which is expensive but excellent in temperature characteristics.

However, the torque sensors of the slide-contact type are expensive and, in addition, are of a contact type. Accordingly, when compared with a non contact type of torque sensor, the problem of abrasion of a brush or a resistor is inevitably encountered, and noise or the like tends to easily occur due to dust produced as the result of the abrasion. It follow, therefore, that the slide-contact type of torque sensor is inferior in reliability or durability. Moreover, since the brush which constitutes part of a detector rotate together with the shafts, in addition, since curled cords are employed as lead wires for outputting purposes, the service life of such a torque sensors has been limited due to the necessity for repetition of winding operations.

In contrast, U.S. Pat. No. 4,784,002 entitled "TORQUE SENSOR" discloses a torque sensor of the non-contact type in which a magnetism sensor is employed in place of the slide contact described above The torque sensor disclosed in this prior patent is arranged including "a first shaft having a fore end portion which is constructed such that a displacement of torsion thereof occurs; a second shaft connected to the first shaft; a predetermined number of N poles and S poles arranged as fixed magnetic poles in alternating sequence so that they surround the periphery of this connecting part; first magnetism pickup paths and second magnetism pickup paths corresponding in number to the N poles and the S poles, respectively, and being located in opposing relationship midway between adjacent poles; and a plurality of magnetism detecting elements provided in non-contact relationship to the first shaft for detecting a change in magnetic flux passing through the first and second pickup paths, at least two of the aforesaid magnetism detecting elements being provided at predetermined angular intervals about the axis of the first shaft so as to correct mechanical decentering with respect to that axis on the first and second pickup paths. This conventional type of torque sensor is arranged so that, when the N poles approach either the first pickup paths or the second pickup paths due to the torsional displacement of the second shaft, the quantity of magnetic flux passing through the first and second pickup paths is varied and the torsional displacement of the first shaft with respect to the second shaft is thereby detected from this variation in the magnetic flux".

The torque sensor employing the above-described magnetism sensor, however, involves a number of problems; firstly the magnetism detecting elements must be provided at predetermined angular intervals about the axes of the first and second shafts; and secondly the N and S poles, each consisting of a single magnet, must be alternately disposed as fixed magnetic poles. In addition, the ease of assembly is remarkably restricted owing to the first and second problems and the number of parts inevitably increases. As a result, the manufacturing cost will increase.

SUMMARY OF THE INVENTION

It is, therefore, a first object of the present invention to provide a torque sensor of the non-contact type which excels in durability, and which has an inexpensive construction and improved flexibility of assembly processes.

It is a second object of the present invention to provide a torque sensor which is capable of stable detection with no pulsations.

It is a third object of the present invention to provide a torque sensor which can detect anomalous states such as breakage of a magnetism sensor.

It is a fourth object of the present invention to provide a torque sensor which is capable of preventing detection of pulsations even with a single magnetism sensor and also which can effectively utilize the magnetic flux of a permanent magnet.

To achieve the above objects, in accordance with the present invention, there is provided a torque sensor for use in detecting torsion of a power steering device or the like of a vehicle. The torque sensor is provided with a first shaft supported for rotation about its axis in a casing, a permanent magnet secured to the first shaft, a second shaft supported for rotation about its axis in the casing and disposed in end-to-end relationship to the first shaft, connecting means for connecting the first shaft and the second shaft, a magnetic core secured to the second shaft, and a magnetism sensor secured to the casing and sandwiched between ring-shaped magnetic members disposed in the vicinity of the outer peripheral face of the magnetic core so that a change in magnetic flux which is caused by a relative displacement between the permanent magnet and the magnetic core is detected by the magnetism sensor as the direction of a variation in the relative position of, and the amount of variation in a displacement of, the first shaft and the second shaft about the axis of rotation of the first and second shafts.

Further objects, features and advantages of the present invention will become apparent from the following detailed description of embodiments of the present invention with reference to the accompanying drawings.

DESCRIPTION OF PREFERRED EMBODIMENTS

Embodiments of the present invention will be described below with reference to the accompanying drawings.

Figure 1:
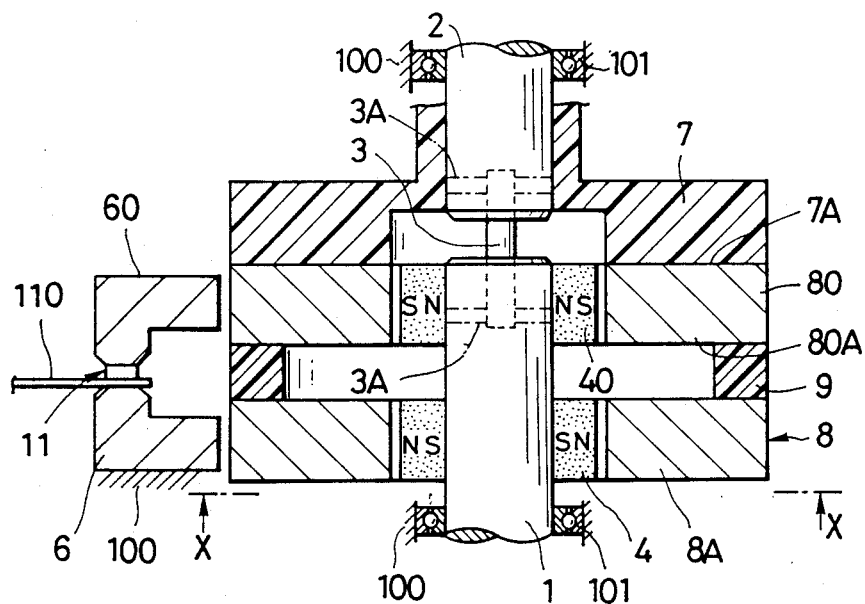
FIG. 1 is a cross-sectional view showing a central portion of a first embodiment of a torque sensor according to the present invention.
Figure 2:
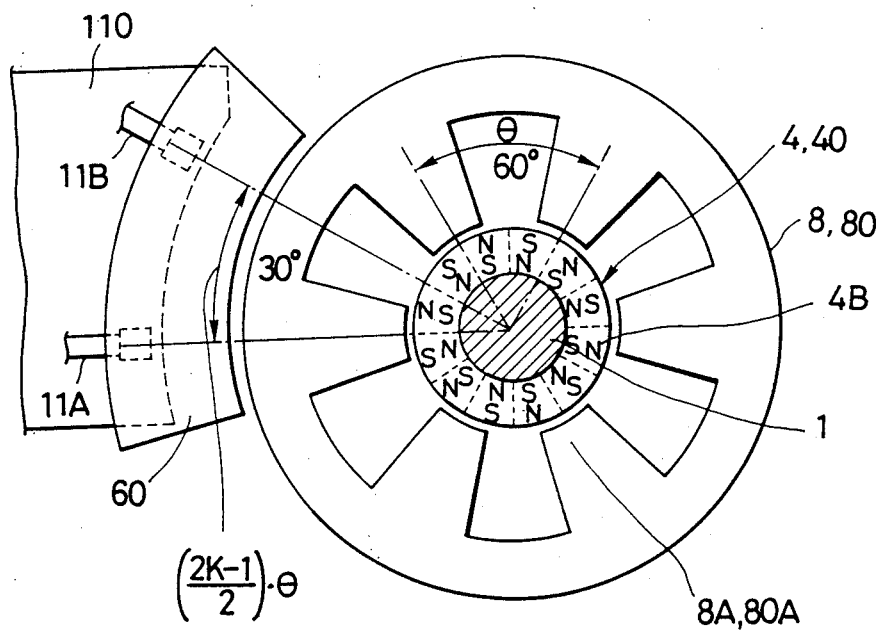
FIG. 2 is a cross-sectional view taken along line X—X of FIG. 1.

With reference to FIGS. 1 and 2, a first embodiment of a torque sensor according to the present invention is explained below. As shown in both figures, the lower end of a first shaft 1 is connected to rotating means (not shown) and is supported for rotation about its axis by a bearing 101 of a body 100. As shown, annular magnets 4 and 40 are secured to the portion of the first shaft 1 which is adjacent to the upper end thereof Each of the annular magnets 4 and 40 has an inner diameter corresponding to the outer diameter of the first shaft 1 and is magnetized with a multiplicity of poles.

A bore is formed in the upper end portion of the first shaft 1 so as to receive and fix the torsion bar 3 shown by a dot-dashed line in FIG. 1, and the first shaft 1 and the torsion bar 3 are joined as shown by means of pins 3A. In other words, the rotary motion of the first shaft 1 is translated into the rotary motions of the annular magnets 4 and 40.

A second shaft 2 is supported for rotation about its axis by the bearing 101 of the body 100, and a bore is formed in the lower end portion of the second shaft 2 so as to receive and fix the torsion bar 3 mentioned above. The first shaft 1 and the second shaft 2 are, as shown, arranged to integrally rotate about their axes via the torsion bar 3 by means of the pins 3A.

A flange member 7 having a lower surface 7A is secured to the second shaft 2 in integral relationship. A lower toothed core 80 made of magnetic material is provided on the lower surface 7A of this flange member 7, and this lower toothed core 80 and an upper toothed core 8 which will be described later are respectively assembled as a single toothed core disc so as to prevent leakage of magnetic flux. In this arrangement, it is not always necessary that the toothed core disc be formed like a single disc, and a plurality of toothed core discs may be laminated.

A spacer 9 made of nonmagnetic material is provided on the lower surface of the lower toothed core 80. The aforementioned lower toothed core 80 and upper toothed core 8, both of which are made of magnetic material, are arranged to sandwich the spacer 9 as shown in FIG. 1 so that the lower and upper toothed cores 80 and 8 are joined with each other via the spacer 9.

As shown in FIG. 1, the annular magnets 4 and 40 are positioned such that the annular magnets 4 and 40 correspond in vertical position to the upper toothed core 8 and the lower toothed core 80, respectively.

A magnetism sensor 11, which is provided on a board 110 by wiring, is sandwiched between sensor members 6 and 60 of magnetic material, as shown in FIG. 1. These sensor members 6 and 60 are disposed on the aforesaid body 100 at a position close to the outer circumferential faces of the upper and lower toothed cores 8 and 80, respectively.

Accordingly, even if these toothed cores and the first and second shafts are rotated, the magnetism sensor 11 fixed to the body 100 does not move. In addition, since the magnetism sensor 11, which is sandwiched between the sensor members 6 and 60, can be incorporated in the direction of the rotary axes of the shafts, the flexibility of design and assembly is improved.

FIG. 2 shows the positional relationship between the annular magnet 4, the upper toothed core 8 and the lower toothed core 80. In this figure, the first shaft 1 and the second shaft 2 are shown as being placed in a mutually neutral state As shown, the annular magnet 4 is magnetized with multiple poles so that the N and S poles are arranged alternately and concentrically about the first shaft 1 and so that a set of twelve magnetic segments are arranged circumferentially about the first shaft 1, each of the magnetic segments having a radial angular extent of 30°. In this arrangement, the number of magnetic segments described above is not limited to twelve, and it is of course possible to make the angle of detection finer or courser by altering the number of magnetic poles, that is to say, by altering the angle by which the circumference is divided in the radial directions.

Each of the upper toothed core 8 and the lower toothed core 80 consists of a laminate of a plurality of discs made of magnetic material As shown, the upper and lower toothed cores 8 and 80 have six core elements 8A and 80A, respectively, so that changes in the magnetic flux of the annular magnets 4 and 40 are detected by the extending end portions of the respective core elements 8A. These core elements 8A and 80A are respectively arranged at angular intervals of an angle $\theta$ (60° in this figure).

The aforesaid magnetism sensor 11, which is sandwiched between the sensor members 6 and 60, consists of a pair of magnetism sensor elements 11A and 11B. As illustrated, these magnetism sensor elements 11A and 11B are spaced apart from each other at an interval of 30° in correspondence with the angular extent of each of the core elements 8A and 80A of the upper and lower toothed cores 8 and 80. In this manner, the provision of this pair of magnetism sensor elements 11A and 11B serves to correct pulsations which may occur in the output from the magnetism sensor 11 in correspondence with the number of teeth of the toothed cores. Although the first embodiment has been described with reference to the example in which each set of core elements 8A and 80A formed at intervals of 60° includes six core elements in total, as described above the larger the number of core elements the higher the accuracy of detection.

If, for the sake of general explanation, it is assumed that the angle $\theta$ represents the angular extent of each of the intervals at which the core elements are formed and that K represents an integer, the angle by which the aforesaid magnetism sensor elements 11A and 11B are spaced apart from each other is represented by Expression $(2K+1)\theta \div 2$. More specifically, if the angle $\theta$ of the interval between adjacent core elements is selected to be 60 degrees as described above, the angle $\theta$ is 30 degrees for K=0, 90 degrees for K=1, and 150 degrees for K=2. If the magnetism sensor elements 11A and 11B are spaced apart by any of these angles, it is possible to correct pulsations which may occur in the output from the magnetism sensor 11 in correspondence with the number of teeth of the toothed cores.

Figure 3:
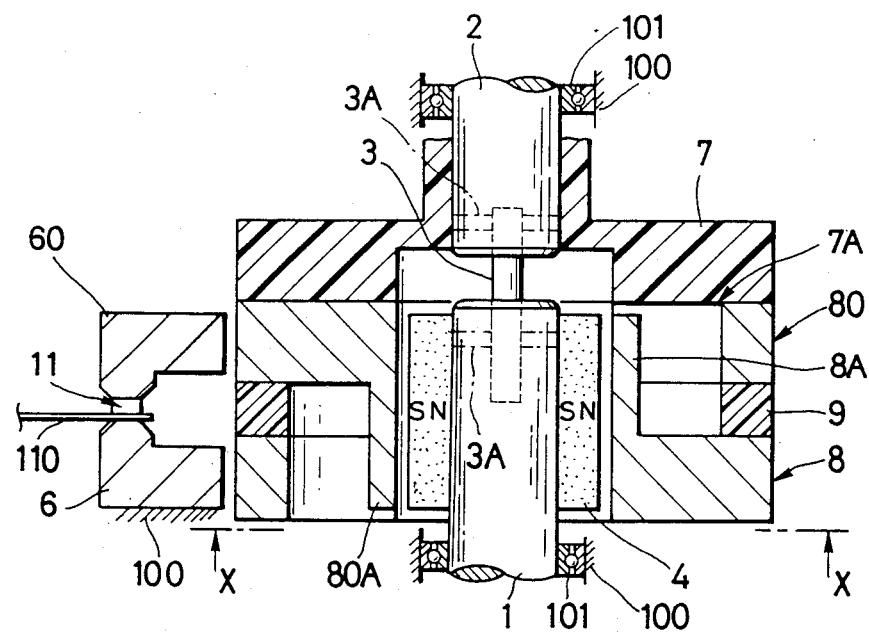
FIG. 3 is a cross-sectional view showing a central portion of a second embodiment of the torque sensor according to the present invention.
Figure 4:
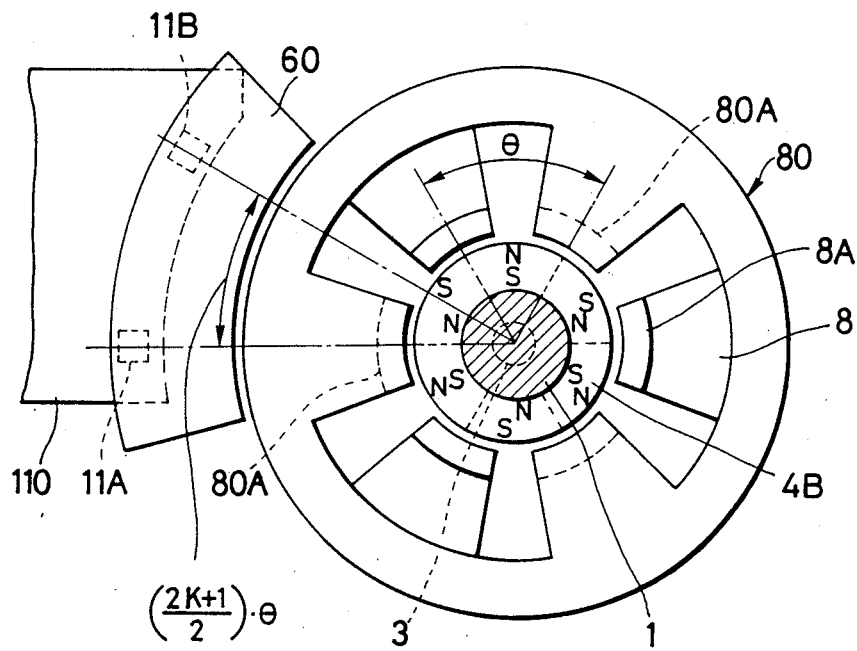
FIG. 4 is a cross-sectional view taken along line X—X of FIG. 3.

Referring to FIGS. 3 and 4, a second embodiment of the torque sensor according to the present invention is explained below. Since the basic construction of the second embodiment does not greatly differ from that of the first embodiment, the same reference numerals are used to denote the same parts as those shown in FIG. 1 and the description thereof is omitted Accordingly, the following explanation is directed to only those portions which differ between the first and second embodiments.

Referring first to FIG. 3, the annular magnet 4 is, as illustrated, magnetized with multiple poles so that a set of six magnetic segments 4B is magnetized with N and S poles alternately and concentrically about the first shaft 1, each of the magnetic segments 4B having an angular extent corresponding to a radial angle of 60°.

As illustrated, the upper toothed core 8 and the lower toothed core 80, each of which consists of a laminate of a plurality of discs made of magnetic material, have three core elements 8A and three core elements 80A, respectively. These three core elements 8A and 80A— six core elements in total, are positioned to surround the outer peripheral face of the annular magnet 4 so that changes in the magnetic flux of the annular magnet 4 are detected by the extending end portions of the core elements 8A and 80A. With this arrangement, only one annular magnet 4 suffices to achieve the requisite performance and, in addition, since the core elements 8A and 80A can oppose all magnetic segments 4B of the annular magnet 4, magnetic forces generated from the magnetic segments 4B can be transmitted to the core elements 8A and 80A with high efficiency compared to the arrangement of the above-described first embodiment in which the magnetic force generated from every other magnetic segment 4B is transmitted to the core elements 8A and 80A. Moreover, the magnetism sensor 11 is disposed on the basis of the above noted expression so as to correct pulsations which may occur in the output from the magnetism sensor 11 in correspondence with the number of teeth of the toothed cores.

Figure 5:
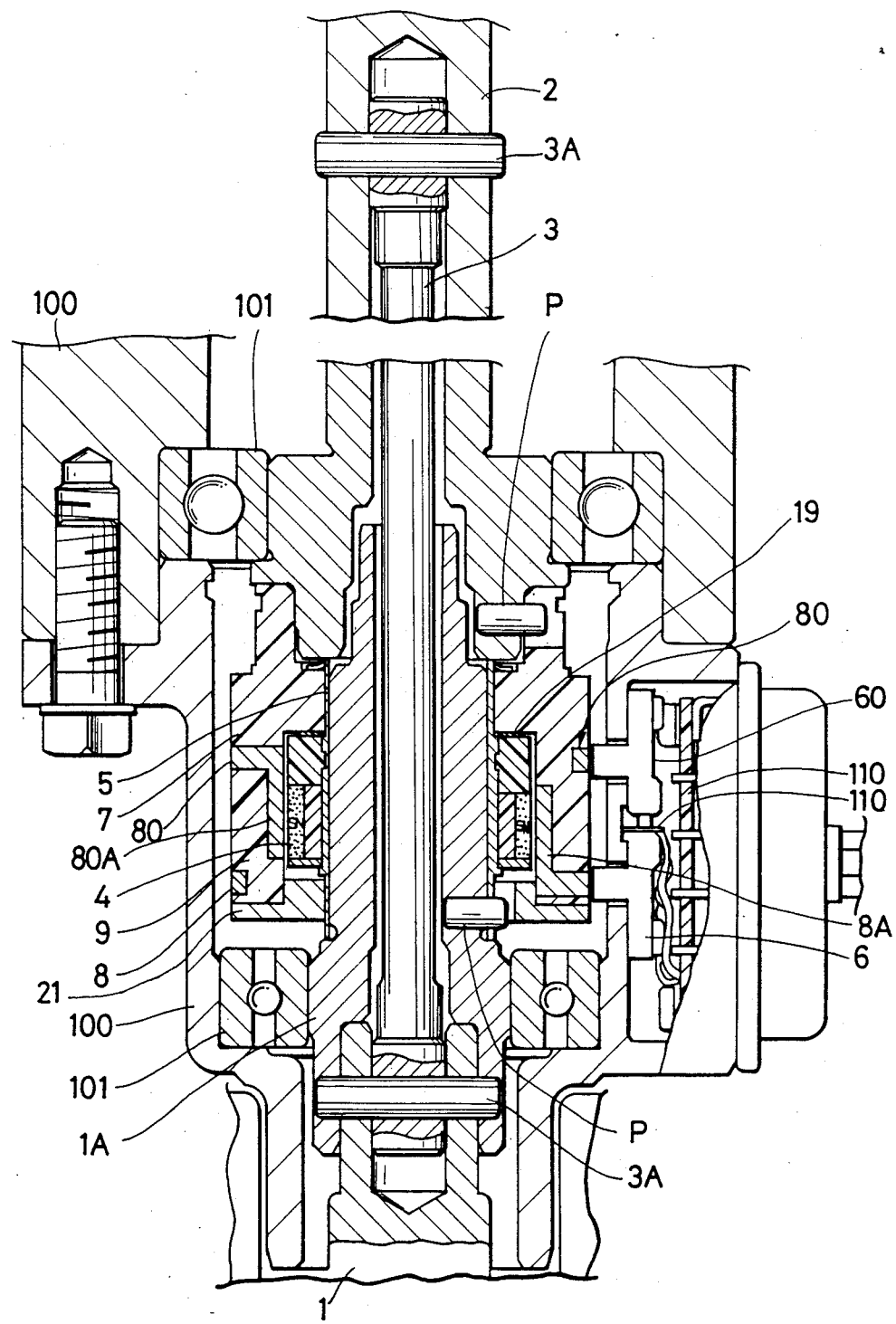
FIG. 5 is a cross-sectional view taken along a central portion of a practical example based on the embodiment shown in FIG. 4.

With reference to FIG. 5, a torque sensor of a type which is reduced to practice is explained below. The construction of this torque sensor is substantially the same as that of the second embodiment shown in FIGS. 3 and 4. Accordingly, no detailed explanation is given and different portions alone are referred to below.

A subsidiary first shaft 1A is secured to one end portion of the first shaft 1 by means of the pin 3A and a sleeve 5 is fitted onto the outer periphery of the subsidiary first shaft 1A. The annular magnet 4 is secured to the outer peripheral face of the subsidiary first shaft 1A by resin molding. This sleeve 5 is secured to the subsidiary first shaft 1A by means of a pin P.

The remaining portion of a space which embraces the flange member 7 and the spacer 9 is charged with resin when integral resin molding is performed after the upper toothed core 8 and the lower toothed core 80 have been positioned at predetermined locations. The flange member 7 is secured to the second shaft 2 by means of another pin P. A slip ring 19 is provided between the annular magnet 4 and the flange member 7 The body 100 consists of two separate parts which are fastened by bolts. Addition of the above-described construction improves the flexibility of assembly of particularly the first shaft 1 and the second shaft 2.

A third embodiment of the torque sensor according to the present invention is explained below with reference FIGS. 6 and 7. Since the basic construction of the third embodiment does not greatly differ from that of the first embodiment which has been explained with reference to FIG. 1, the same reference numerals are used to denote the same parts as those shown in FIG. 1 and the description thereof is omitted. Accordingly, the following explanation is directed to only those portions which differ between the first and second embodiments.

Figure 6:
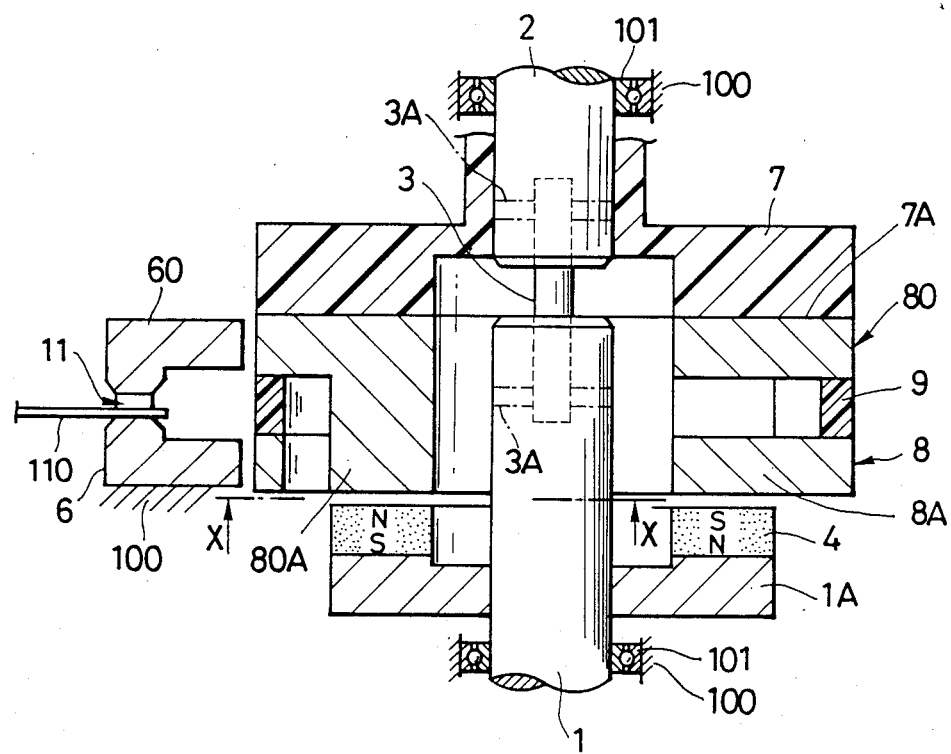
FIG. 6 is a cross-sectional view showing a central portion of a third embodiment of the torque sensor according to the present invention.
Figure 7:
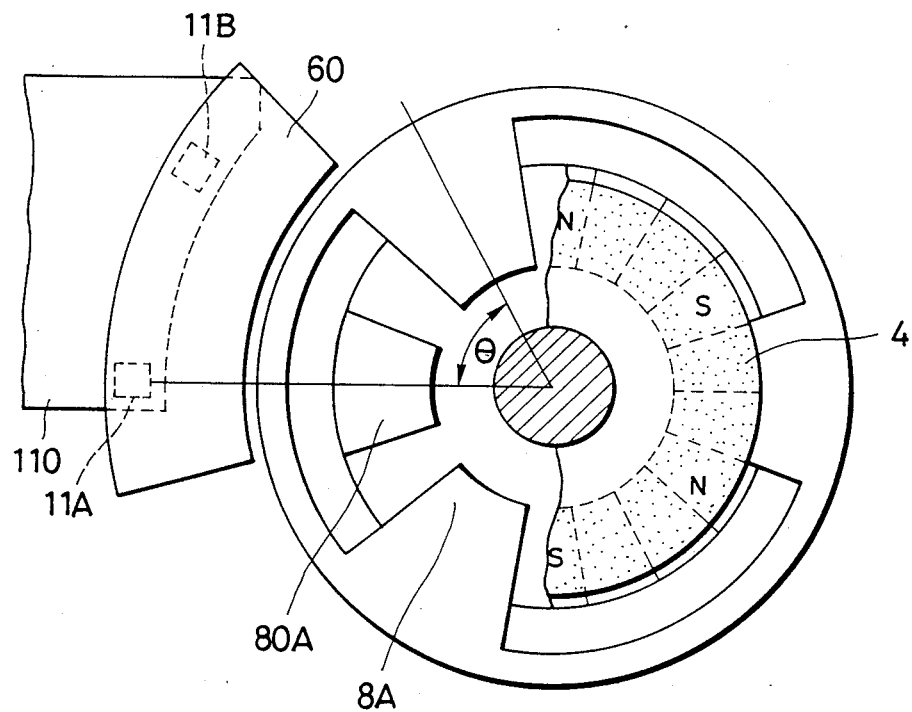
FIG. 7 is a cross-sectional view taken along line X—X of FIG. 6.

Referring to FIG. 6, the annular magnet 4 is, as illustrated, magnetized with multiple poles so that a set of six magnetic segments 4B is magnetized with N and S poles alternately along the length of the first shaft 1, each of the magnetic segments 4B having an angular extent corresponding to a radial angle of 60°.

As illustrated, the upper toothed core 8 and the lower toothed core 80, each of which consists of a laminate of a plurality of discs made of magnetic material, have three core elements 8A and three core elements 80A, respectively. These three core elements 8A and 80A—six core elements in total, are positioned to closely face the upper face of the annular magnet 4 so that changes in the magnetic flux of the annular magnet 4 are detected by the extending end portions of the core elements 8A and 80A. With this arrangement, only one annular magnet 4 suffices to achieve the requisite performance and, in addition, since the core elements 8A and 80A can oppose all magnetic segments 4B of the annular magnet 4, the magnetic forces generated from the magnetic segments 4B can be transmitted to the core elements 8A and 80A with high efficiency compared to the arrangement of the above-described first embodiment in which the magnetic force generated from every other magnetic segment 4B is transmitted to the core elements 8A and 80A. Moreover, the magnetism sensor 11 is disposed on the basis of the above-noted expression in order to correct pulsations which may occur in the output from the magnetism sensor 11 in correspondence with the number of teeth of the toothed cores.

Figure 8:
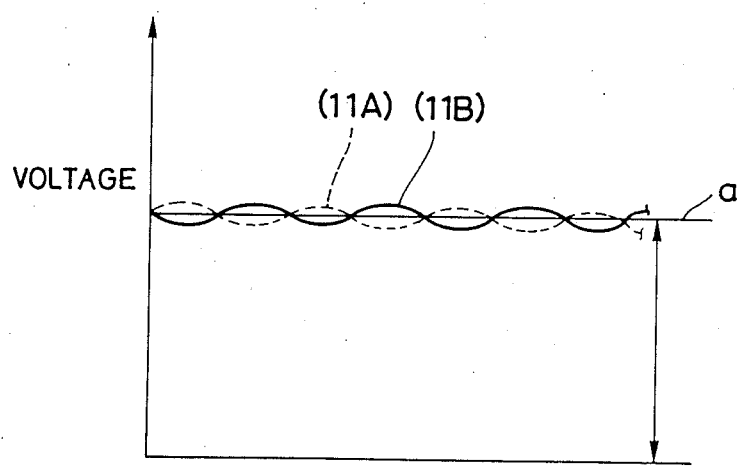
FIG. 8 is a waveform chart which serves to illustrate outputs from the magnetism sensor used in a particular embodiment.

As shown in FIG. 8, which shows the pulsation waveforms of the output from the magnetism sensor 11, output waveforms 11A and 11B from the magnetism sensor 11 are 180° out of phase with each other so that they cancel each other on the basis of a reference voltage a which will be described later.

Figure 9:
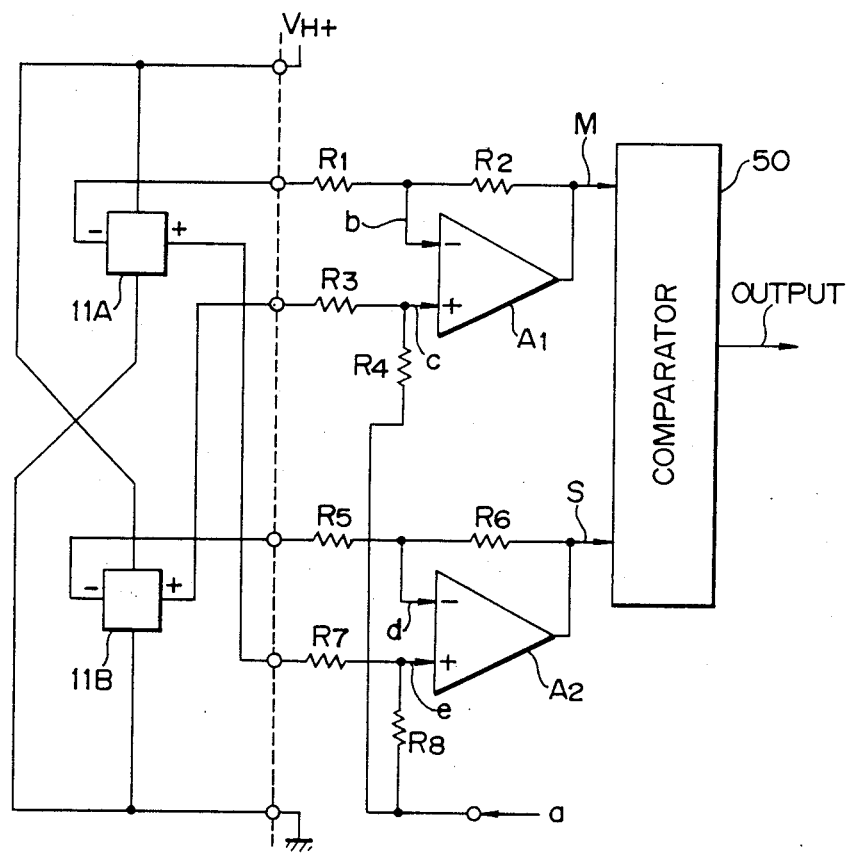
FIG. 9 is a circuit diagram showing an example of a differential amplifier circuit connected to a torque sensor having a construction such as that shown in any of the above embodiments.

As shown in FIG. 9, the magnetism sensor 11, which comprises magneto-resistive devices (MR devices), Hall devices and the like, consists of a pair of magnetism sensor elements 11A and 11B. A positive output from the magnetism sensor element 11A and a negative output from the magnetism sensor element 11B are subjected to differential amplification in an amplifier $A_2$ and the resulting voltage signal is provided as a subsidiary output S. In the meantime, a negative output from the magnetism sensor element 11A and a positive output from the magnetism sensor element 11B are subjected to differential amplification in an amplifier $A_1$ and the resulting voltage signal is provided as a main output M. The main output M and the subsidiary output S are sent to a comparator 50 so that the final output signal is obtained.

In FIG. 9, $R_N$ (N = 1 to 8) denotes a resistor, $A_1$ and $A_2$ denote amplifiers such as transistors, and b, c, d and e denote input signals, each having a particular polarity, supplied to the amplifiers $A_1$ and $A_2$.

Figure 10:
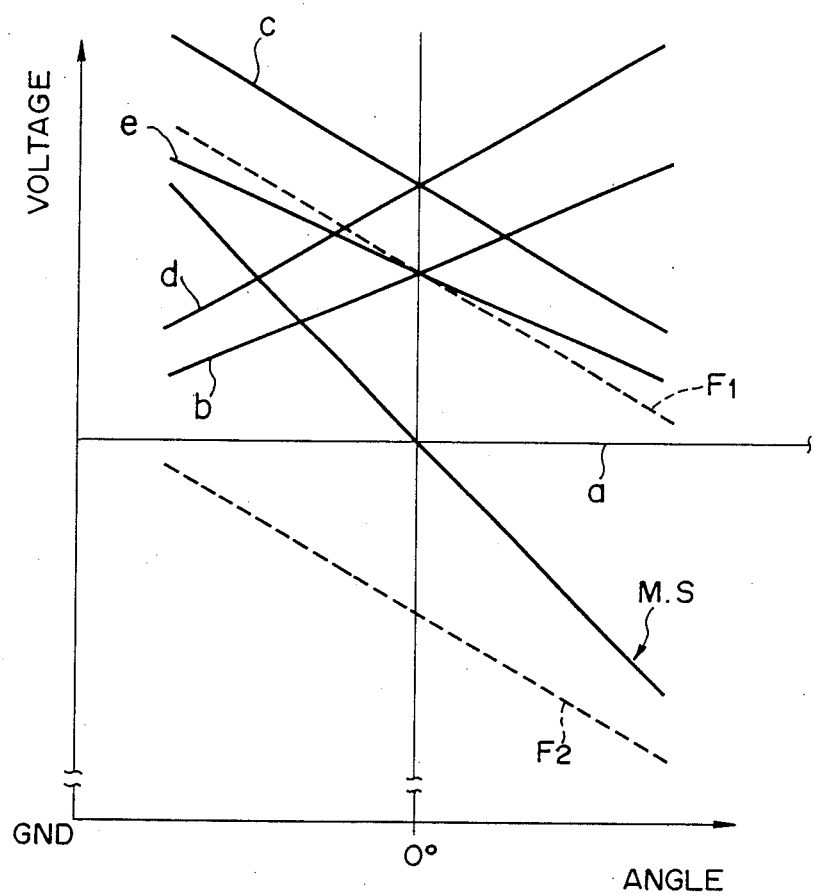
FIG. 10 is a diagram showing signal waveforms appearing in the differential amplifier circuit shown in FIG. 9.

As shown in FIG. 10, each of the input signals b, c, d and e varies linearly on the basis of the reference voltage a, whereas each of the main output M and the subsidiary output S is provided in the form of a waveform which, as illustrated at M.S, passes through a crosspoint of the reference voltage a and a reference angle of 0°.

If any anomalous event such as breakage takes place in either the magnetism sensor element 11A or the magnetism sensor element 11B, the main output M and the subsidiary output S, the output waveforms of both of which substantially coincide with each other during normal operation, are provided in such a manner that their waveforms are separated into the waveform represented by a dashed line $F_1$ and the waveform represented by a dashed line $F_2$. The comparator 50 detects these separated waveforms to detect the anomalous event.

Figure 11:
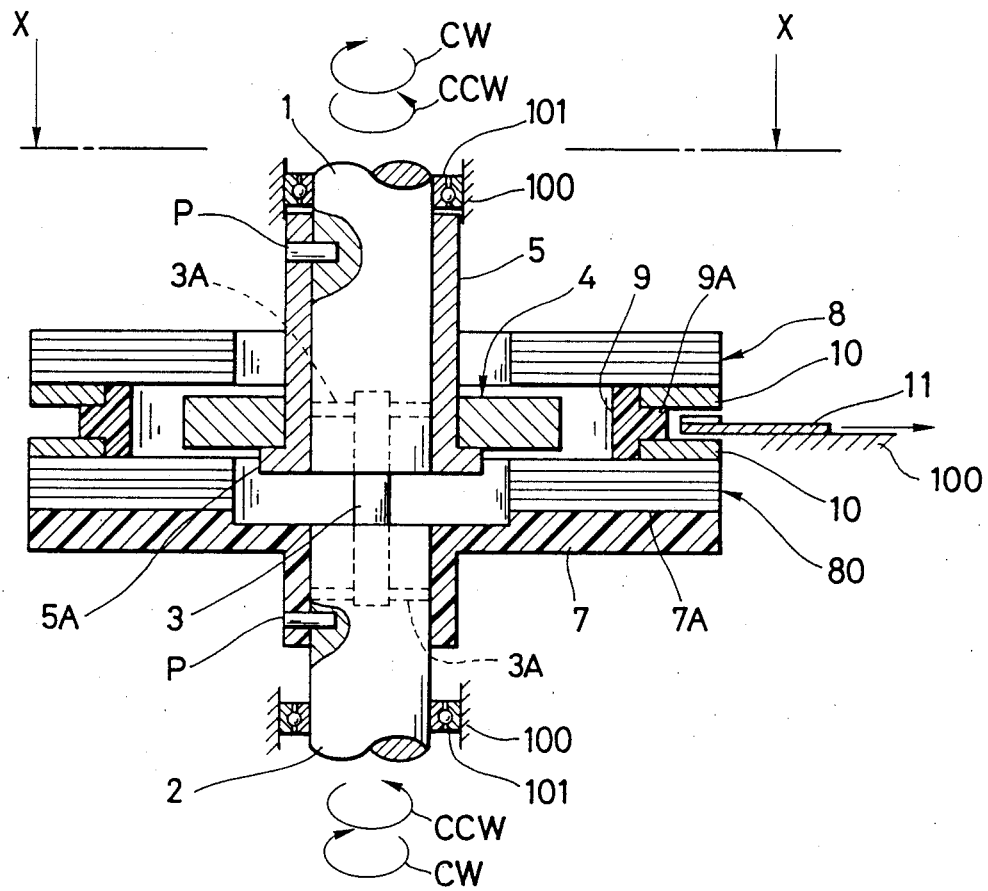
FIG. 11 is a cross-sectional view showing a central portion of a fourth embodiment of the torque sensor according to the present invention.
Figure 12:
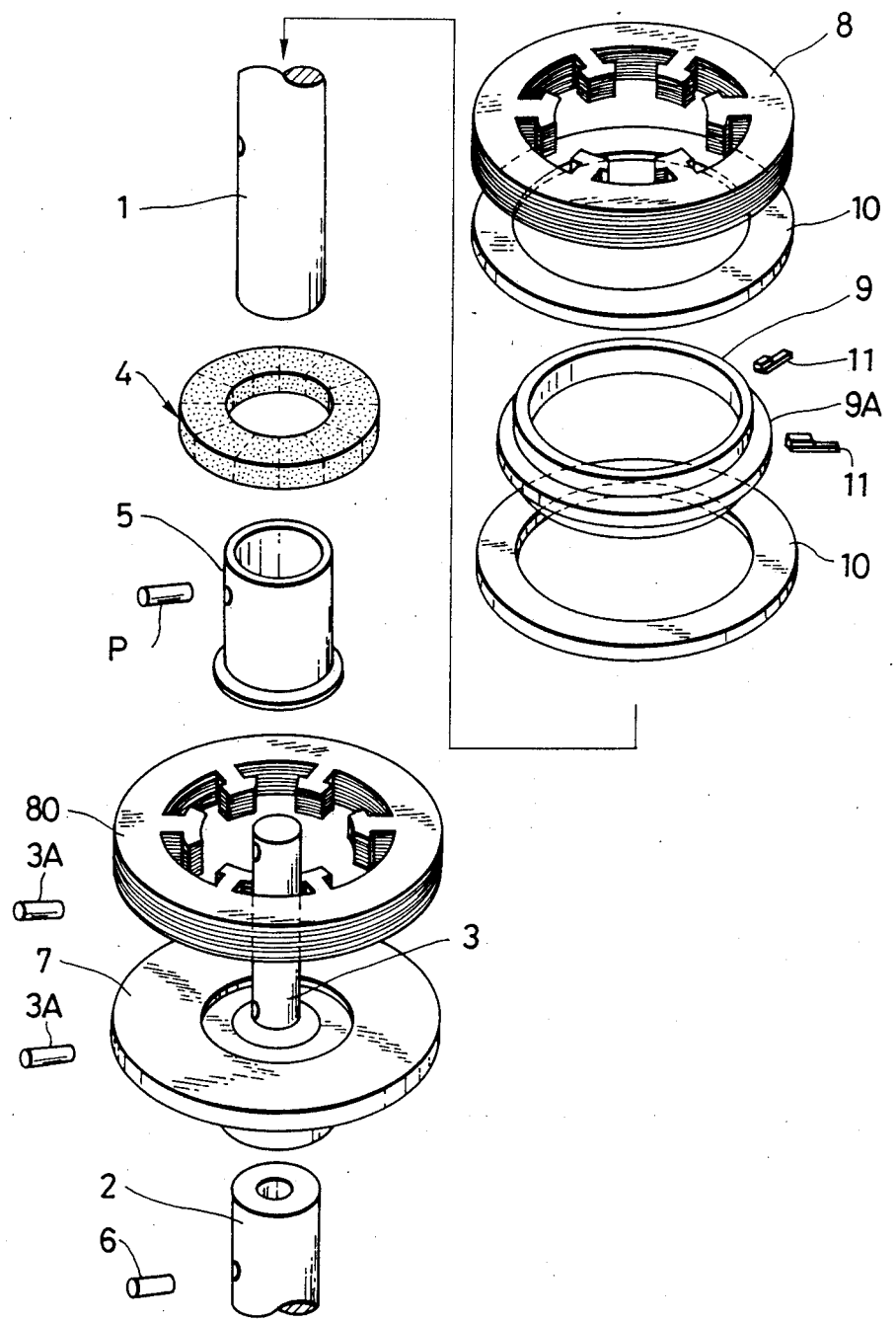
FIG. 12 is an exploded perspective view of the torque sensor shown in FIG. 11.

A fourth embodiment of the torque sensor according to the present invention is explained below with reference to FIGS. 11 and 12. In both figures, the upper end portion of the first shaft 1 is connected to a steering wheel (not shown) or the like, and is supported by the bearing 101 of the body 100 so that it can selectively rotate in the direction CW indicated by a clockwise arrow and the direction CCW indicated by a counterclockwise arrow. The sleeve 5 is secured to the lower end portion of the first shaft 1 by means of the pin P. The annular magnet 4 is magnetized with multiple poles and has an inner diameter which corresponds to the outer diameter of the sleeve 5. The annular magnet 4 is secured in such a manner as to abut on a flange portion 5A of the sleeve 5. A bore is formed in the lower end portion of the first shaft 1 so as to receive and fix the torsion bar 3, and the first shaft 1 and the torsion bar 3 are integrally assembled by means of the pin 3A shown by a dot-dashed line. In other words, the rotary motion of the first shaft 1 is translated into the rotary motion of the annular magnet 4.

The second shaft 2 is supported for rotation about its axis by the bearing 101 of the body 100, and another bore is formed in the upper end portion of the second shaft 2 so as to receive and fix the torsion bar 3. The first shaft 1 and the second shaft 2 are joined by pins P shown by dashed lines so that they can integrally rotate about their axes by means of the torsion bar 3. The flange member 7 having the lower surface 7A is secured to the second shaft 2 in integral relationship by means of a pin P.

The lower toothed core 80 made of magnetic material is provided on the upper surface 7A of this flange member 7. This lower toothed core 80 consists of a laminate of a plurality of toothed core discs and serves to prevent magnetic flux from leaking to the outside. If it is only necessary to detect the direction of displacement or if no high measurement accuracy is needed, the upper toothed core disc does not necessarily need a laminated structure and a core having a single-layer structure may be employed. The spacer 9 made of nonmagnetic material is provided on the upper surface of the lower toothed core 80. An annular extension 9A of the spacer 9 is sandwiched by a pair of rings 10 which are made of magnetic material. This pair of rings 10 serves to conduct the magnetic flux of the lower and upper toothed cores 80 and 8. The upper toothed core 8 is formed to have a structure similar to that of the lower toothed core 80, and is provided on the ring 10 positioned on the annular extension 9A of the spacer 9 so that the annular magnet 4 is partially sandwiched between the upper and lower toothed cores 8 and 80.

The magnetism sensor 11 is secured to the body 100 at a location between the upper toothed core 8 and the lower toothed core 80. Accordingly, even if these toothed cores and the first and second shafts are rotated, the magnetism sensor 11 fixed to the body 100 does not move, whereby this rotation has no effect on any wiring connected to the magnetism sensor 11.

Figure 13:
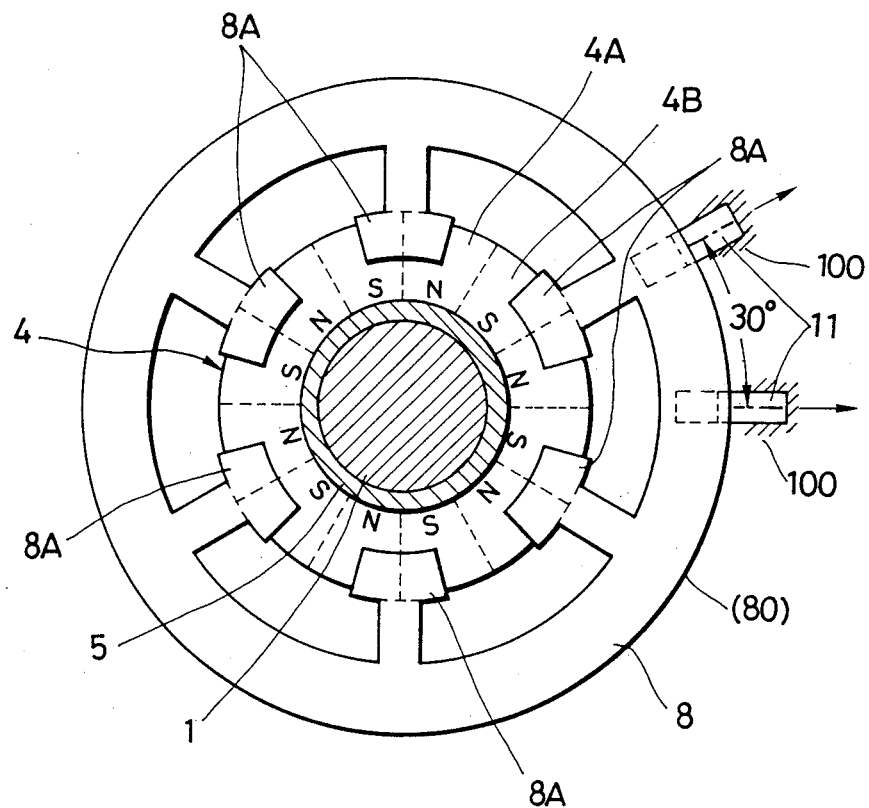
FIG. 13 is a cross-sectional view taken along line X—X of FIG. 11.

Referring to FIG. 13, the first shaft 1 and the second shaft 2 are shown as being placed in a neutral state. As shown, the annular magnet 4 is magnetized with multiple poles so that six magnetic segments 4A and six magnetic segments 4B—twelve magnetic segments in total, are alternately arranged about the first shaft 1. Each magnetic segment 4A has an angular extent corresponding to a radial angle of approximately 30°, being magnetized with a N pole toward the axis of rotation of the first shaft 1. Each magnetic segment 4B has an angular extent corresponding to a radial angle of approximately 30°, being magnetized with a S pole toward the axis of rotation of the first shaft 1. In this arrangement, the number of magnetic segments described above is not limited to twelve, and it is of course possible to make the angle of detection finer or courser by altering the number of magnetic poles, that is to say, by altering the angle by which the circumference is divided in the radial directions.

Each of the upper toothed core 8 and the lower toothed core 80 consists of a laminate of a plurality of discs made of magnetic material As shown, the upper and lower toothed cores 8 and 80 have six core elements 8A and 80A, respectively, so that changes in the magnetic flux of the annular magnets 4 and 40 are detected by the extending end portions of the core elements 8A.

As illustrated, magnetism sensor elements, which constitute the magnetism sensor 11, are provided on the body 100 at a location between the upper toothed core 8 and the lower toothed core 80, the magnetism sensor elements being spaced apart from each other at an interval of approximately 30°. The operational state of each magnetism sensor element is detected by a detector circuit (not shown) so that, if either of the magnetism sensor elements outputs an abnormal signal due to an accident such as breakage, then pulsations which occur in the output from the magnetism sensor 11 in correspondence with the number of teeth of the toothed cores are corrected.

Figure 14A:
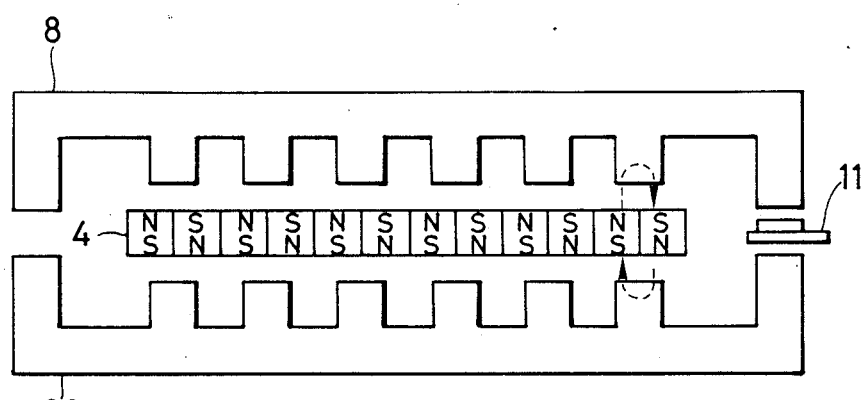
FIG. 14A is a schematic exploded view showing the manner in which the first shaft 1 is in a neutral position.

Referring to FIG. 14A, in a neutral state wherein no rotational force acts on the first shaft 1, adjacent magnetic segments 4A and 4B of the annular magnet 4 form a closed magnetic short circuit such as that shown by dashed lines. Accordingly, no magnetic flux occurs in a gap which is defined between the upper toothed core 8 and the lower toothed core 80. In other words, the magnetism sensor 11, which consists of a magneto-resistive device (MR device), a Hall device or the like provides no output voltage. Accordingly, the magnetic flux density of the magnet does not vary even due to temperature changes, with the result that the output voltage at the neutral position does not vary.

Figure 14B:
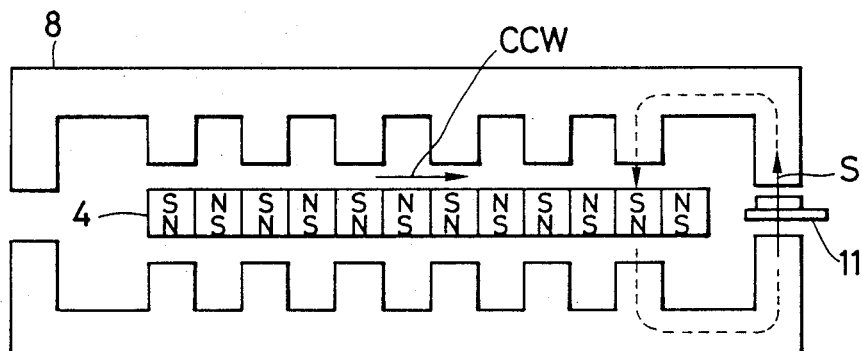
FIG. 14B is a schematic exploded view showing the manner in which the first shaft 1 is rotated in the counterclockwise direction.

As shown in FIG. 14B, when the first shaft 1 is rotated in the counterclockwise direction CCW, the balance between the adjacent magnetic segments 4A and 4B of the annular magnet 4 collapses. As a result, magnetic flux which has the polarities of the magnetic segments 4A and 4B passes through the upper and lower toothed cores 8 and 80. Accordingly, a voltage occurs in the magnetism sensor 11 by virtue of magnetic flux which flows from the lower toothed core 80 to the upper toothed core 8.

Figure 14C:
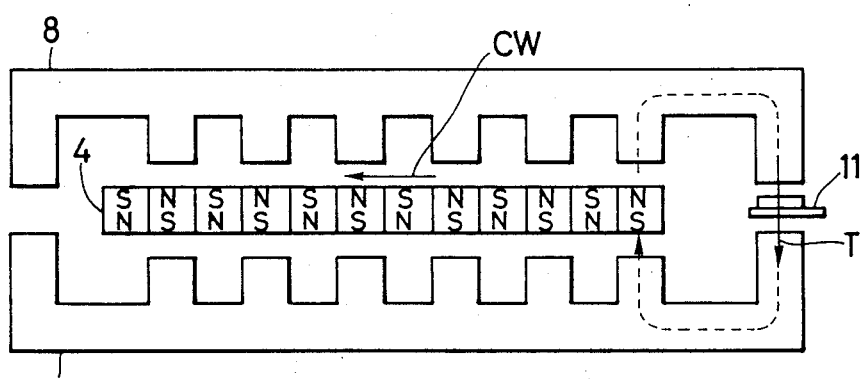
FIG. 14C is a schematic exploded view showing the manner in which the first shaft 1 is rotated in the clockwise direction.

As shown in FIG. 14C, when the first shaft 1 is rotated in the clockwise direction CW, the balance between the adjacent magnetic segments 4A and 4B of the annular magnet 4 collapses. As a result, magnetic flux which has the polarities of the magnetic segments 4A and 4B passes through the upper and lower toothed cores 8 and 80. Accordingly, the magnetism sensor 11 produces a voltage which acts from the lower toothed core 80 to the upper toothed core 8. In this manner, the direction of rotation of the first shaft 1 can be detected in accordance with whether the polarity of the voltage generated in the magnetism sensor 11 is positive or negative.

Moreover, the output voltage of the magnetism sensor 11 is approximately proportional to variations in the angle of the annular magnet 4.

Figure 15:
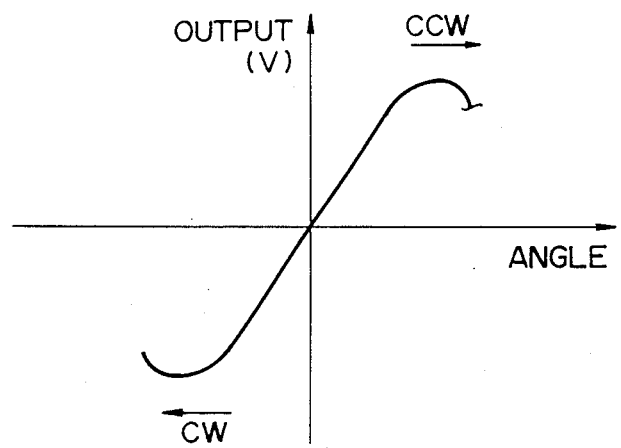
FIG. 15 is a graphic representation showing the relationship between the output voltage of the magnetism sensor 11 and the annular magnet 4.

Referring to FIG. 15, when the first shaft 1 is rotated in the counterclockwise direction CCW, a voltage V is output which varies in accordance with a waveform which varies upwardly approximately linearly as the outer peripheral face of a particular magnetic segment 4A of the annular magnet 4A approaches the magnetism sensor 11 and then varies downwardly as the succeeding magnetic segment 4B approaches the magnetism sensor 11.

On the other hand, when the first shaft 1 is rotated in the clockwise direction CW, a voltage V is output which varies in accordance with a waveform which varies downwardly approximately linearly as the outer peripheral face of a particular magnetic segment 4A of the annular magnet 4A approaches the magnetism sensor 11 and then varies upwardly as the succeeding magnetic segment 4B approaches the magnetism sensor 11.

In other words, the magnetism sensor 11 can detect not merely the direction of the angle of rotation but also the amount of variation in the angle of rotation.

The torque sensor having the above-described construction can be applied to an electrically-operated type of power steering device, and an applied example of such a torque sensor is explained with reference to FIGS. 16 to 17.

Figure 16:
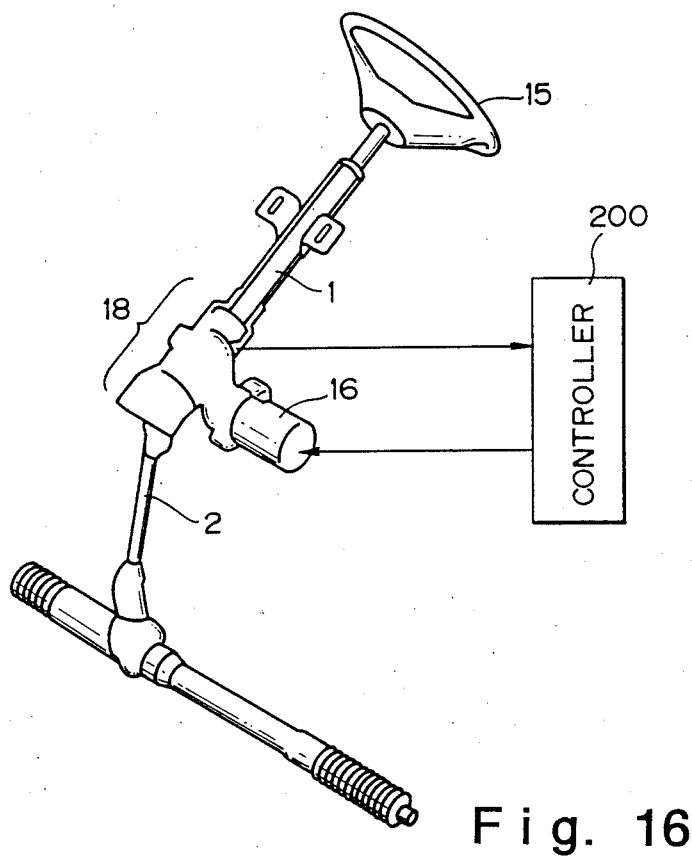
FIG. 16 is a diagrammatic view showing the construction of an electrically operated type power steering device.

Referring to FIG. 16, a steering wheel 15 is provided on the upper end portion of the aforesaid first shaft 1, and the lower end portion of the aforesaid second shaft 2 is connected to a steering gear box. A body 18 is formed as a portion for connecting the first shaft 1 and the second shaft 2, and an electrical motor 16 and the aforesaid torque sensor are incorporated in this body 18.

A controller 200 consists of electronic circuits such as a CPU and other associated elements, and serves to receive a detection signal from the torque sensor and to control driving of the electrical motor 16. The operation of the electrically-operated type of power steering device having the construction described above is explained with reference to the flow chart shown in FIG. 17.

Figure 17:
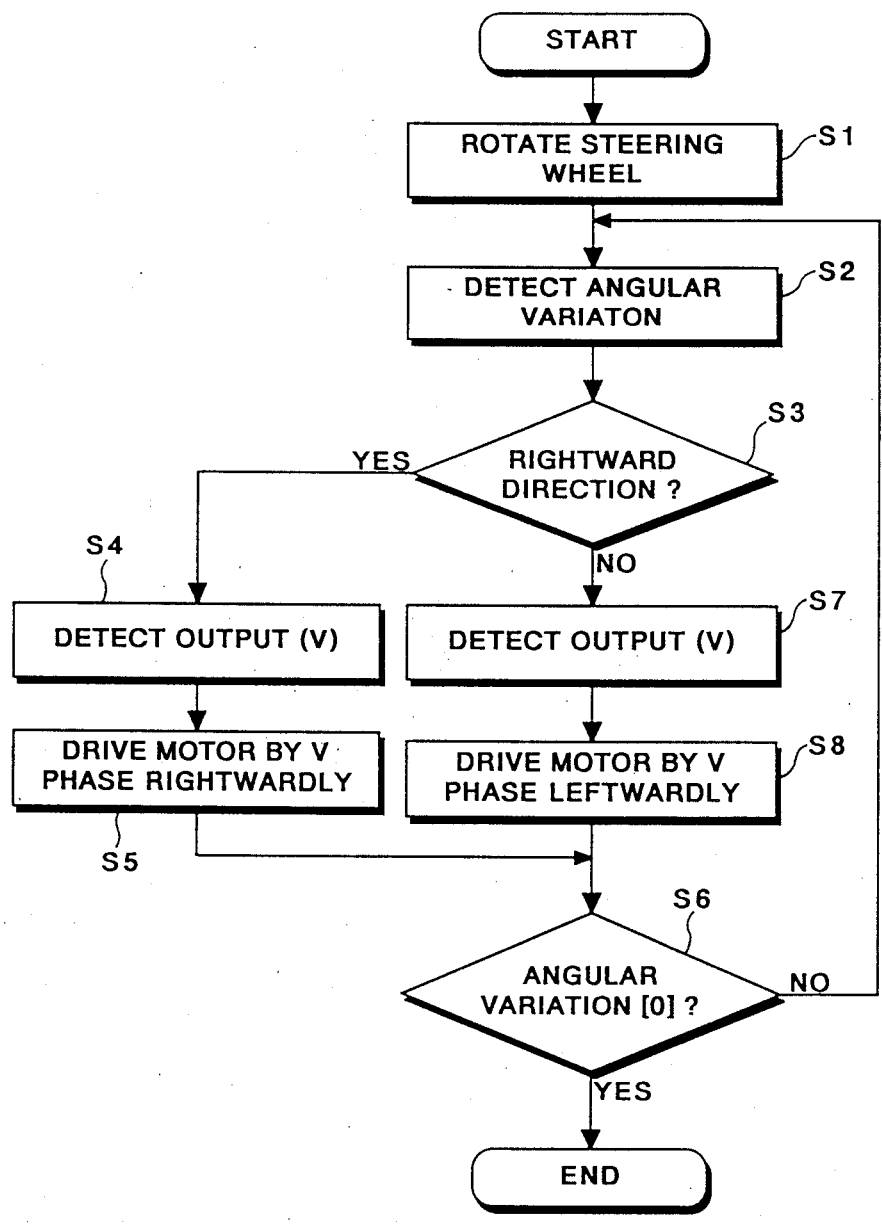
FIG. 17 is a flow chart showing an electrically-operated type power steering device.

Referring to FIG. 17, in Step S1, when a driver operates the steering wheel 15, the flow proceeds to Step S2, where the magnetism sensor 11 detects an angular variation of the annular magnet 4 of the torque sensor. As described previously, since the magnetism sensor 11 has the capability to detect the direction of rotation, whether the direction of rotation is the rightward direction, that is, the CW direction, is determined in Step S3. If it is determined that the direction of rotation is the rightward direction, the process proceeds to Step S4, where the magnetism sensor 11 detects the aforesaid value V which represents the amount of angular variation.

When this value V is input to the controller 200, the electrical motor 16 is driven in the rightward direction by an amount proportional to the value V, whereby the function of a so-called power steering device is achieved. In Step S6, the driving of the electrical motor 16 is continued until the magnitude of the angular variation of the magnetism sensor 11 reaches zero and, when zero is reached, the electrical motor 16 comes to a halt.

If it is determined in Step S3 that the direction of rotation is the leftward direction, the process proceeds to Step S7, where the magnetism sensor 11 detects the aforesaid value V which represents the amount of angular variation. When this value V is input to the controller 200, the electrical motor 16 is driven in the leftward direction by an amount proportional to the value V. In Step S6, the driving of the electrical motor 16 is continued until the magnitude of the angular variation of the magnetism sensor 11 reaches zero and, when zero is reached, the electrical motor 16 comes to a halt.

While the first shaft 1 and the second shaft 2 are rotating at the same time, even if the driver stops operating the steering wheel 15 at an arbitrary angle and again rotates it to a further extent, the torque sensor can be actuated in a manner similar to that illustrated in the flow chart since the value V has already been zero. In addition, no memory means for storing a current angle is needed and the angle of displacement alone may be detected at any time.

Figure 18:
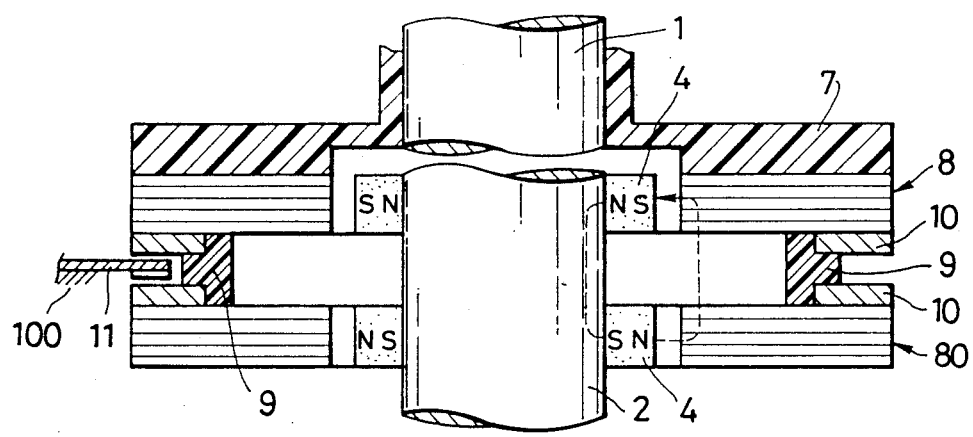
FIG. 18 is a cross-sectional view showing a central portion of a torque sensor according to a fifth embodiment in neutral position.

A fifth embodiment of the torque sensor according to the present invention is explained with reference to FIGS. 18 and 19. As shown in FIG. 18, the upper toothed core 8 and the lower toothed core 80 are joined by one pair of rings 10 and a spacer 9, and are secured to the flange member 7. The first shaft 1, rotatably supported on the body 100 by a bearing (not shown), is provided integrally with this flange member 7.

The second shaft 2 is disposed for rotation with respect to the first shaft 1 and is supported on the body 100 by a bearing (not shown) As illustrated, two annular magnets 4 are secured to the positions on the second shaft 2 which oppose the upper toothed core 8 and the lower toothed core 80, respectively.

The respective annular magnets 4 include upper and lower sets of twelve magnetic segments which are magnetized with alternate poles as will be described later In order that a closed magnetic short circuit such as that shown by a two-dot chain line be formed between arbitrary opposing magnetic segments in the upper and lower sets, the magnetic segments of the upper and lower sets are offset from each other by one segment.

The magnetism sensor 11 is provided on the body 100 in such a manner that the detecting portion of the former is located at a gap defined between the pair of rings 10.

Figure 19:
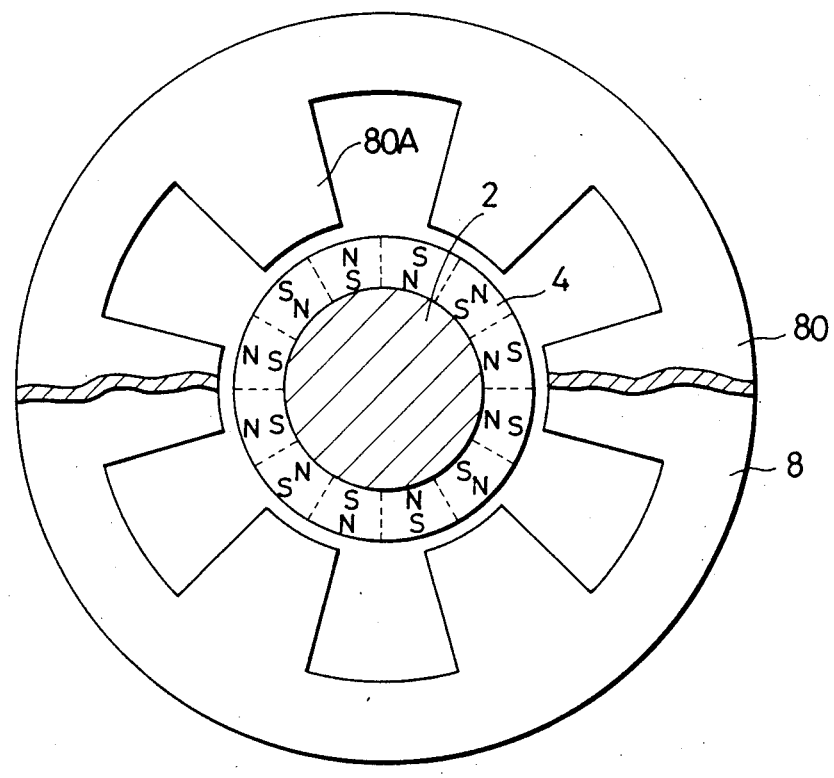
FIG. 19 is a plan view of the cross-sectional view shown in FIG. 18.

Referring to FIG. 19, the pair of annular magnets 4 is secured, as shown, to the outer peripheral face of the second shaft 2. Each of the annular magnets 4 is provided with twelve magnetic segments which are magnetized with radially alternate poles The magnetic segments are disposed so that the extending end portions of the core elements 8A and 80A of the upper toothed core 8 and the lower toothed core 80, which are secured to the first shaft 1, are located at the boundaries between the magnetic segments.

The torque sensor having the above-described construction can operate in a manner similar to that of the fourth embodiment. With the arrangement illustrated in the fifth embodiment, it is possible to lighten assembly/disassembly operation to a great extent.

Figure 20:
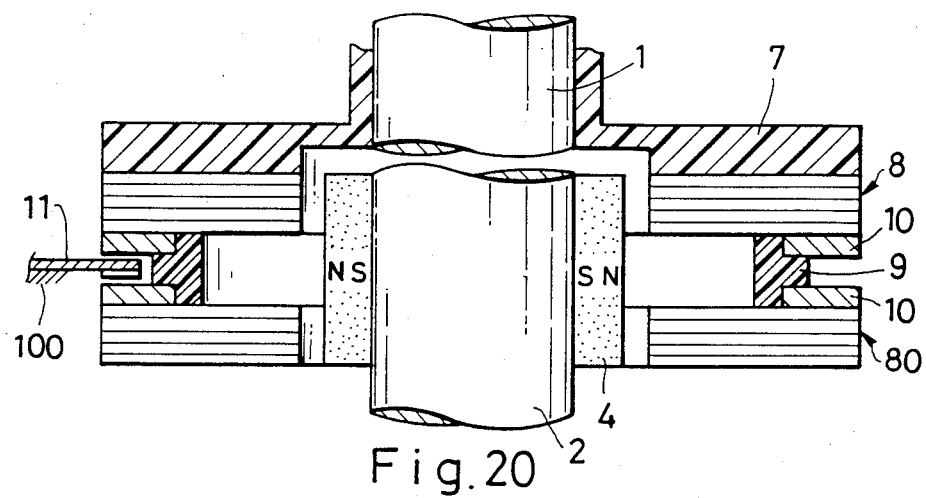
FIG. 20 is a cross-sectional view showing a central portion of a torque sensor according to a sixth embodiment in neutral position.

A sixth embodiment of the torque sensor according to the present invention is explained with reference to FIGS. 20 and 21. As shown in FIG. 20, the upper toothed core 8 and the lower toothed core 80 are joined by one pair of rings 10 and a spacer 9, and are secured to the flange member 7. The first shaft 1, rotatably supported on the body 100 by a bearing (not shown), is provided integrally with this flange member 7.

The second shaft 2 is disposed for rotation with respect to the first shaft 1 and is supported on the body 100 by a bearing (not shown) As illustrated, a single annular magnet 4 is secured to the position on the second shaft 2 which opposes the upper toothed core 8 and the lower toothed core 80.

The annular magnet 4 includes a total of twelve magnetic segments which are magnetized with alternate poles as will be described later in order that a closed magnetic short circuit (not shown) be formed. The magnetism sensor 11 is provided on the body 100 in such a manner that the detecting portion of the former is located at a gap defined between the pair of rings 10.

Figure 21:
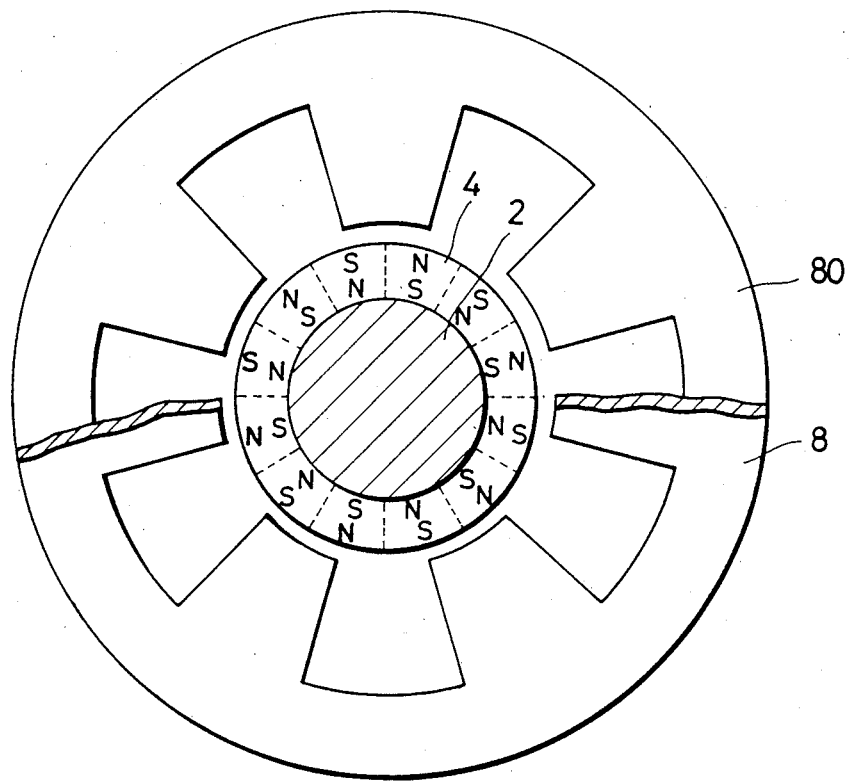
FIG. 21 is a plan view of the cross-sectional view shown in FIG. 20.

Referring to FIG. 21, the annular magnet 4 is secured, as shown, to the outer peripheral face of the second shaft 2. The annular magnet 4 is provided with twelve magnetic segments which are magnetized with radially alternate poles The magnetic segments are disposed so that the extending end portions of the core elements 8A and 80A of the upper toothed core 8 and the lower toothed core 80, which are secured to the first shaft 1, are located at the boundaries between the magnetic segments.

The torque sensor having the above-described construction can operate in a manner similar to that of the fifth embodiment. If the construction illustrated in the firth embodiment is utilized, it is possible to lighten assembly/disassembly operation to a great extent, and the manufacturing cost will decrease since a single annular magnet 4 suffices for each apparatus.

Any of the above embodiments has been explained with reference to only the illustrate construction in which an angular displacement about the rotating axis is detected. However, the annular magnet 4 and the toothed cores 8 and 80 may each be formed into a linear configuration and secured to the first and second shafts so that the displacement in the axial direction, that is, in the linear direction, can be detected.

Although the above explanations have been made with illustrative reference to the applied example in which the torque sensor is applied to an electrically-operated type of power steering device, the torque sensor according to the present invention can of course be applied to power tools, machine tools, domestic electrical appliances, industrial machines and equipment or the like.

A seventh embodiment of the torque sensor according to the present invention is explained with reference to FIGS. 22 and 23. As shown in both figures, the lower end of the first shaft 1 is connected to rotating means (not shown) or the like and is supported for rotation about its axis by the bearing 101 of the body 100. As shown, the annular magnets 4 and 40 are secured to the portion of the first shaft 1 which is adjacent to the upper end thereof, and each of the annular magnets 4 and 40 has an inner diameter corresponding to the outer diameter of the first shaft 1 and is magnetized with a multiplicity of poles.

Figure 22:
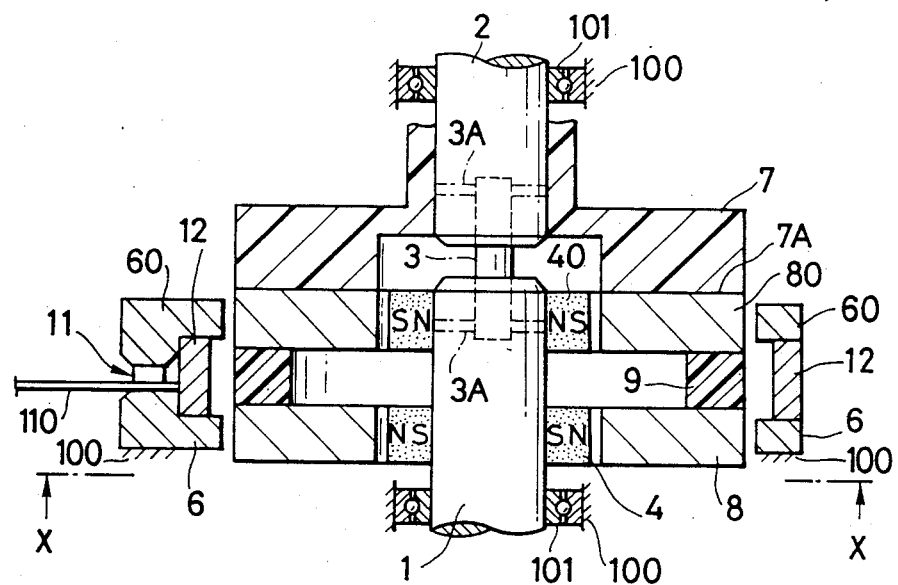
FIG. 22 is a cross-sectional view showing a central portion of a seventh embodiment of the torque sensor according to the present invention.

A bore is formed in the upper end portion of the first shaft 1 so as to receive and fix the torsion bar 3 shown by a dot-dashed line in FIG. 22, and the first shaft 1 and the torsion bar 3 are joined as shown by means of the pins 3A. In other words, the rotary motion of the first shaft 1 is translated into the rotary motions of the annular magnets 4 and 40.

The second shaft 2 is supported for rotation about its axis by the bearing 101 of the body 100, and a bore is formed in the lower end portion of the second shaft 2 so as to receive and fix the torsion bar 3 mentioned above. The first shaft 1 and the second shaft 2 are arranged to integrally rotate about their axes by means of the torsion bar 3, as shown.

The flange member 7 having the lower surface 7A is secured to the second shaft 2 in integral relationship. The lower toothed core 80 made of magnetic material is provided on the lower surface 7A of this flange member 7, and this lower toothed core 80 and the upper toothed core 8 which will be described later are respectively assembled as a single toothed core disc so as to prevent leakage of magnetic flux. In this arrangement, it is not always necessary that the toothed core disc be formed like a single disc, and a plurality of toothed core discs may be laminated.

The spacer 9 made of nonmagnetic material is provided on the lower surface of the lower toothed core 80. The aforementioned lower toothed core 80 and upper toothed core 8, both of which are made of magnetic material, are arranged to sandwich the spacer 9 as shown in FIG. 1 so that the lower and upper toothed cores 80 and 8 are joined with each other via the spacer 9.

As shown in FIG. 22, the annular magnets 4 and 40 are positioned such that they correspond in vertical position to the upper toothed core 8 and the lower toothed core 80, respectively.

The magnetism sensor 11, which is provided on the board 110 by wiring, is sandwiched between the sensor members 6 and 60 of magnetic material, as shown in FIG. 22. These sensor members 6 and 60 are disposed on the aforesaid body 100 at a position close to the outer circumference faces of the upper and lower toothed cores 8, respectively.

Accordingly, even if these toothed cores and the first and second shafts are rotated, the magnetism sensor 11 fixed to the body 100 does not move. In addition, since the magnetism sensor 11, which is sandwiched between the sensor members 6 and 60, can be incorporated in the direction of the rotary axes of the shafts, the flexibility of design and assembly is improved.

Figure 23:
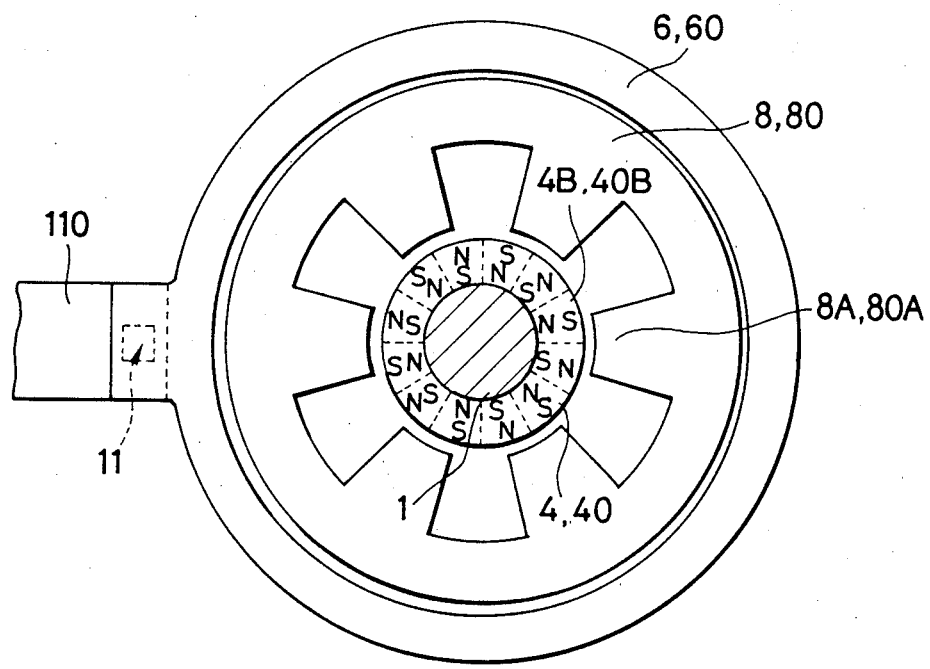
FIG. 23 is a cross-sectional view taken along line X—X of FIG. 22.

FIG. 23 shows the positional relationship between the annular magnet 4, the upper toothed core 8 and the lower toothed core 80. In this figure, the first shaft 1 and the second shaft 2 are shown as being placed in a mutually neutral state. As shown, the annular magnet 4 is magnetized with multiple poles so that the N and S poles are arranged alternately and concentrically about the first shaft 1 and so that a set of twelve magnetic segments are arranged circumferentially about the first shaft 1, each of the magnetic segments having a radial angular extent of 30°.

In this arrangement, the number of magnetic segments described above is not limited to twelve, and it is of course possible to make the angle of detection finer or courser by altering the number of magnetic poles, that is to say, by altering the angle by which the circumference is divided in the radial directions.

Each of the upper toothed core 8 and the lower toothed core 80 consists of a laminate of a plurality of discs made of magnetic material As shown, the upper and lower toothed cores 8 and 80 have six core elements 8A and 80A, respectively, so that changes in the magnetic flux of the annular magnets 4 and 40 are detected by the extending end portions of the respective core elements 8A. These core elements 8A and 80A are respectively arranged at angular intervals of an angle of 60°.

The aforesaid magnetism sensor 11, which is sandwiched between the ring-shaped sensor members 6 and 60, consists of a pair of magnetism sensor elements 11A and 11B. These members 6 and 60 are joined by a ring-shaped sub-spacer 12 and the inner peripheral faces of the sensor members 6 and 60 oppose the outer peripheral faces of the upper and lower toothed cores 8 and 80, respectively.

The provision of this magnetism sensor 11 enables detection of magnetism with no pulsations since pulsations which may occur in the output from the magnetism sensor 11 in correspondence with the number of teeth of the toothed core are integrated over the entire circumference.

Figure 24:
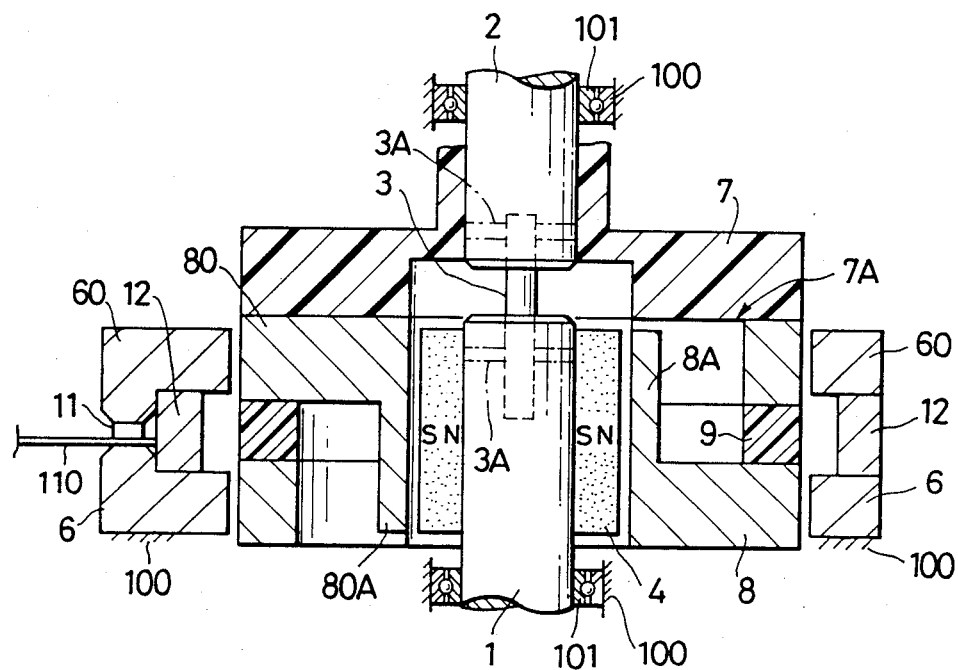
FIG. 24 is a cross-sectional view showing a central portion of an eighth embodiment of the torque sensor according to the present invention.

FIG. 24 is a cross sectional view of a central portion of an eighth embodiment of the torque sensor according to the present invention. The basic construction of the eight embodiment is substantially the same as that of the seventh embodiment which has been explained in connection with FIG. 22. Accordingly, the same reference numerals are used to denote the same elements as those shown in FIG. 22 and the description thereof is omitted.

Referring to FIG. 24, the annular magnet 4 is, as illustrated, magnetized with multiple poles so that a set of six magnetic segments 4B is magnetized with the N and S poles alternately and concentrically about the first shaft 1, each of the magnetic segments 4B having an angular extent corresponding to a radial angle of 60°. The upper toothed core 8 and the lower toothed core 80, each of which is made of magnetic material, have three core elements 8A and three core elements 80A, respectively. These three core elements 8A and 80A— six core elements in total, are positioned to surround the outer peripheral face of the annular magnet 4 so that changes in the magnetic flux of the annular magnet 4 are detected by the extending end portions of the core elements 8A and 80A.

With this arrangement, only one annular magnet 4 suffices to achieve the requisite performance and, in addition, since the core elements 8A and 80A can oppose all magnetic segments 4B of the annular magnet 4. Accordingly, as explained in connection with the first embodiment, the magnetic forces generated from the magnetic segments 4B can be transmitted to the core elements 8A and 80A with high efficiency compared to the arrangement in which the magnetic force generated from every other magnetic segment 4B is transmitted to the core elements 8A and 80A.

The aforesaid magnetism sensor 11 is sandwiched between the ring-shaped sensor members 6 and 60. These members 6 and 60 are joined by the ring shaped sub-spacer 12 and, as illustrated, the inner peripheral faces of the sensor members 6 and 60 oppose the outer peripheral faces of the upper and lower toothed cores 8 and 80, respectively. The provision of this magnetism sensor 11 enables detection of magnetism with no pulsations since pulsations which may occur in the output from the magnetism sensor 11 in correspondence with the number of teeth of the toothed core are integrated over the entire circumference.

A ninth embodiment of the torque sensor according to the present invention is explained below with reference to FIG. 25. Since the basic construction of the second embodiment does not greatly differ from that of the seventh embodiment, the same reference numerals are used to denote the same parts as those shown in FIG. 22 and the description thereof is omitted. Accordingly, the following explanation is directed to only those portions which differ between the first and second embodiments.

Figure 25:
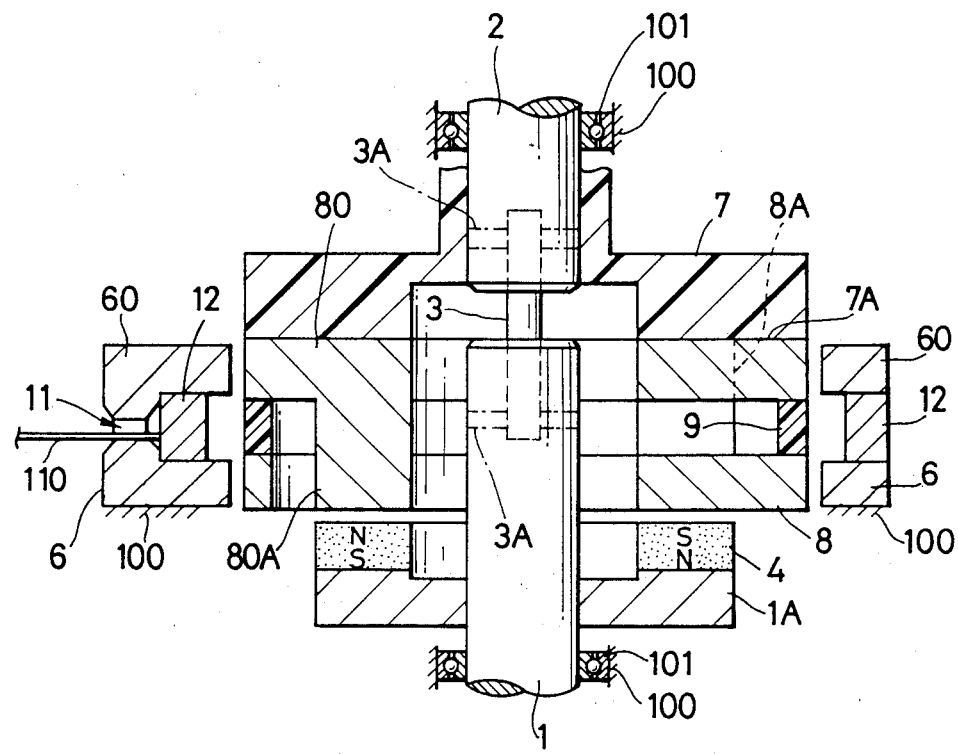
FIG. 25 is a cross-sectional view showing a central portion of a ninth embodiment of the torque sensor according to the present invention.

Referring first to FIG. 25, the annular magnet 4 is, as illustrated, magnetized with multiple poles so that a set of six magnetic segments 4B is magnetized with N and S poles alternately along the length of the first shaft 1, each of the magnetic segments 4B having an angular extent corresponding to a radial angle of 60°.

As illustrated, the upper toothed core 8 and the lower toothed core 80, each of which consists of a laminate of a plurality of discs made of magnetic material, have three core elements 8A and three core elements 80A, respectively. These three core elements 8A and 80A—six core elements in total, are positioned closely to the upper surface of the annular magnet 4 so that changes in the magnetic flux of the annular magnet 4 are detected by the extending end portions of the core elements 8A and 80A.

With this arrangement, only one annular magnet 4 suffices to achieve the requisite performance and, in addition, since the core elements 8A and 80A can oppose all magnetic segments 4B of the annular magnet 4, the magnetic forces generated from the magnetic segments 4B can be transmitted to the core elements 8A and 80A with high efficiency compared to the arrangement of the above-described first embodiment in which the magnetic force generated from every other magnetic segment 4B is transmitted to the core elements 8A and 80A.

The aforesaid magnetism sensor 11 is sandwiched between the ring-shaped sensor members 6 and 60. These members 6 and 60 are joined by the ring-shaped sub-spacer 12 and, as illustrated, the inner peripheral faces of the sensor members 6 and 60 oppose the outer peripheral faces of the upper and lower toothed cores 8 and 80, respectively.

The provision of this magnetism sensor 11 enables detection of magnetism with no pulsations since pulsations which may occur in the output from the magnetism sensor 11 in correspondence with the number of teeth of the toothed core are integrated over the entire circumference.

As explained above in connection with the seventh to ninth embodiments of the torque sensor according to the present invention, only one magnetism sensor can be employed to prevent detection of pulsations and it therefore becomes possible to effectively utilize the magnetic flux of permanent magnets. Of course, for the purpose of a fail-safe mechanism, a plurality of magnetism sensors may be incorporated.

While the invention has been particularly shown and described with reference to the first to ninth embodiments as well as the practicable and applied examples thereof, it is apparent that various modifications and alternative constructions may be employed without departing from the true spirit and scope of the invention as defined by the appended claims.

What is claimed is:

1. A torque sensor comprising:
    a first shaft supported for rotation about its axis in a casing;
    an annular permanent magnet, magnetized with a multiplicity of poles, and secured to said first shaft;
    a second shaft supported for rotation about its axis in said casing and disposed in end-to-end relationship to said first shaft;
    connecting means for connecting said first shaft and said second shaft;
    a magnetic core secured to said second shaft, said annular permanent magnet being rotatably displaceable relative to said magnetic core to cause a magnetic flux variation; and
    a magnetism sensor secured to said casing and sandwiched between magnetic members disposed in the vicinity of an outer peripheral face of said magnetic core,
    said magnetism sensor for detecting from said magnetic flux variation a direction of displacement and an amount of displacement of said first shaft relative to said second shaft.

2. A torque sensor according to claim 1, wherein said permanent magnet is magnetized in a direction parallel to the axis of rotation of said first and second shafts.

3. A torque sensor according to claim 1, wherein said permanent magnet is magnetized in a radial direction thereof with respect to the axis of rotation of said first and second shafts.

4. A torque sensor according to claim 1, wherein said permanent magnet is attached to said first shaft via a sleeve.

5. A torque sensor according to claim 1, wherein said magnetic core has a toothed configuration including tooth-like projections which are spaced apart at intervals of an angle $\theta$, said magnetic sensor being provided including a pair of first and second magnetism sensor elements, said first and second magnetism sensor elements being spaced apart from each other by an angle corresponding to $2K+1) \theta \div 2$, where K is an integer.

6. A torque sensor according to claim 5, wherein said first magnetism sensor element and said second magnetism sensor element are each arranged to selectively provide a positive output and a negative output, said torque sensor being arranged to compare an output result obtained by applying differential amplification to the positive output from said first magnetism sensor element with an output result obtained by applying differential amplification to the negative output from said second magnetism sensor element, thereby detecting the anomalous state of at least one of said first magnetism sensor element and said second magnetism sensor element.

7. A torque sensor comprising:
    a first shaft supported for rotation about its axis in a casing;
    an annular permanent magnet magnetized with a multiplicity of poles and secured to said first shaft;
    a second shaft supported for rotation about its axis in said casing and disposed in end-to-end relationship to said first shaft;
    connecting means for connecting said first shaft and said second shaft;
    a magnetic core secured to said second shaft, said permanent magnet being rotatably displaceable relative to said magnetic core to cause a magnetic flux variation; and a magnetism sensor secured to said casing and sandwiched between magnetic members disposed in a magnetic circuit formed by said permanent magnet and said magnetic core, said magnetism sensor for detecting from said magnetic flux variation a direction of displacement and an amount of displacement of said first shaft relative to said second shaft.

8. A torque sensor according to claim 7, wherein said permanent magnet is magnetized in a direction parallel to the axis of rotation of said first and second shafts.

9. A torque sensor according to claim 7, wherein said permanent magnet is magnetized in a radial direction thereof with respect to the axis of rotation of said first and second shafts.

10. A torque sensor according to claim 7, wherein said permanent magnet is attached to said first shaft via a sleeve.

11. A torque sensor according to claim 7, wherein said magnetic core includes a pair of magnetic core elements, said permanent magnet and said magnetism sensor being interposed between said pair of magnetic core elements.

12. A torque sensor according to claim 7, wherein said magnetic core has an approximately C-shaped cross section.

13. A torque sensor according to claim 7, wherein said magnetic core has projections formed around its inner circumference.

14. A torque sensor according to claim 7, wherein said magnetic core has a toothed configuration in which the number of teeth is half the number of poles of said permanent magnet.

15. A torque sensor comprising:

a first shaft supported for rotation about its axis in a casing;

a permanent magnet secured to said first shaft;

a second shaft supported for rotation about its axis in said casing and disposed in end-to-end relationship to said first shaft;

connecting means for connecting said first shaft and said second shaft;

a magnetic core secured to said second shaft, said permanent magnet being rotatably displaceable relative to said magnetic core to cause a magnetic flux variation; and a magnetism sensor secured to said casing and sandwiched between ring-shaped magnetic members disposed in the vicinity of an outer peripheral face of said magnetic core, said magnetism sensor for detecting from said magnetic flux variation a direction of displacement and an amount of displacement of said first shaft relative to said second shaft.

* * * * *

UNITED STATES PATENT AND TRADEMARK OFFICE
CERTIFICATE OF CORRECTION

PATENT NO. : 4,984,474

DATED : January 15, 1991

INVENTOR(S) : JUN MATSUSHIMA ET AL

It is certified that error appears in the above-identified patent and that said Letters Patent is hereby corrected as shown below:

Claim 5, column 16, line 43, "2K" should be --(2K--.

Signed and Sealed this

Nineteenth Day of May, 1992

Attest:

DOUGLAS B. COMER

Attesting Officer

Acting Commissioner of Patents and Trademarks